(12) United States Patent
Yamashita et al.

(10) Patent No.: US 11,127,427 B1
(45) Date of Patent: Sep. 21, 2021

(54) MAGNETIC DISK DEVICE AND SERVO WRITE METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Satoshi Yamashita, Yokohama Kanagawa (JP); Takahiro Aoki, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 17/016,091

(22) Filed: Sep. 9, 2020

(30) Foreign Application Priority Data

Mar. 18, 2020 (JP) .............................. JP2020-048088

(51) Int. Cl.
 *G11B 5/596* (2006.01)
(52) U.S. Cl.
 CPC ...... *G11B 5/59661* (2013.01); *G11B 5/59688* (2013.01)
(58) Field of Classification Search
 CPC ................................. G11B 21/02; G11B 5/596
 See application file for complete search history.

(56) References Cited

U.S. PATENT DOCUMENTS

| | | | |
|---|---|---|---|
| 7,209,312 B1 | 4/2007 | Sutardja | |
| 7,230,789 B1* | 6/2007 | Brunnett | G11B 5/59633 360/75 |
| 7,256,956 B2* | 8/2007 | Ehrlich | G11B 5/59633 360/75 |
| 7,349,171 B2 | 3/2008 | Rutherford et al. | |
| 7,414,809 B2* | 8/2008 | Smith | G11B 5/59633 360/77.08 |
| 7,457,071 B1* | 11/2008 | Sheh | G11B 5/596 360/48 |
| 7,639,446 B2* | 12/2009 | Mizukoshi | G11B 5/59633 360/51 |
| 7,675,705 B2* | 3/2010 | Mizukoshi | G11B 5/596 360/75 |
| 8,634,283 B1* | 1/2014 | Rigney | G11B 5/59666 369/44.28 |
| 9,245,560 B1* | 1/2016 | Nie | G11B 5/59666 |
| 9,824,708 B2 | 11/2017 | Liang et al. | |

* cited by examiner

*Primary Examiner* — K. Wong
(74) *Attorney, Agent, or Firm* — Kim & Stewart LLP

(57) ABSTRACT

According to one embodiment, a servo write method includes a head and a disk having a plurality of spiral servo patterns which are written radially in a first direction from a first area to a second area other than the first area at velocity that varies between the first area and the second area, the method including moving the head in a second direction opposite to the first direction to read each of the spiral servo patterns, measuring a plurality of time intervals at which each of the spiral servo patterns is read in the first area, and writing a plurality of servo patterns to the first area based on the time intervals.

19 Claims, 10 Drawing Sheets

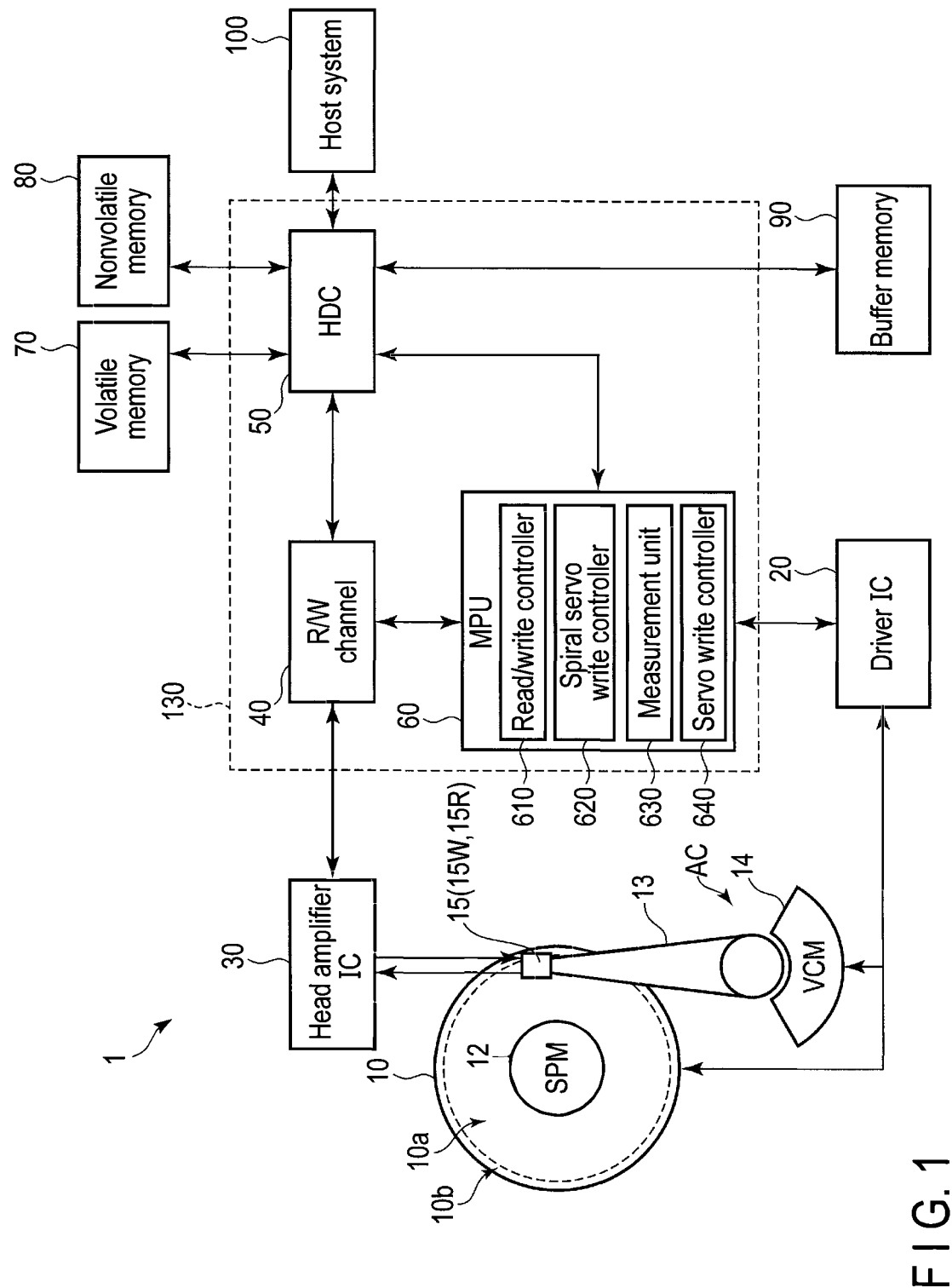
F I G. 1

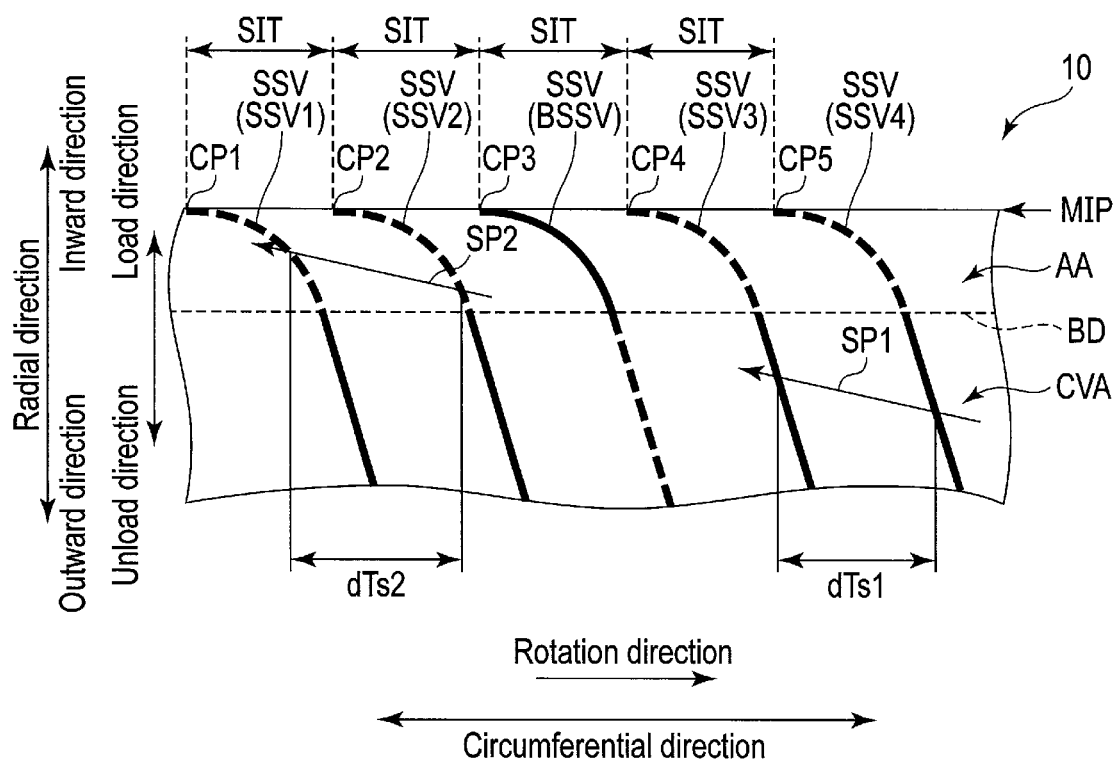
F I G. 5

| Spiral time interval | Spiral velocity | Spiral velocity |
|---|---|---|
| ⋮ | ⋮ | ⋮ |
| dTs(k-1) | SVE(k-1) | y(k-1) |
| dTs(k) | SVE(k) | y(k) |
| dTs(k+1) | SVE(k+1) | y(k+1) |
| ⋮ | ⋮ | ⋮ |

| Target position | Track number | Spiral velocity |
|---|---|---|
| ⋮ | ⋮ | ⋮ |
| TP(s-1) | TN(s-1) | SV(s-1) |
| TP(s) | TN(s) | SV(s) |
| TP(s+1) | TN(s+1) | SV(s+1) |
| ⋮ | ⋮ | ⋮ |

| Target position | Track number | Target spiral timing |
|---|---|---|
| ⋮ | ⋮ | ⋮ |
| TP(s-1) | TN(s-1) | dTts(s-1) |
| TP(s) | TN(s) | dTts(s) |
| TP(s+1) | TN(s+1) | dTts(s+1) |
| ⋮ | ⋮ | ⋮ |

TB3

F I G. 9

| Target position | Track number | Position conversion factor |
|---|---|---|
| ⋮ | ⋮ | ⋮ |
| TP(s-1) | TN(s-1) | SG(s-1) |
| TP(s) | TN(s) | SG(s) |
| TP(s+1) | TN(s+1) | SG(s+1) |
| ⋮ | ⋮ | ⋮ |

TB4

F I G. 10

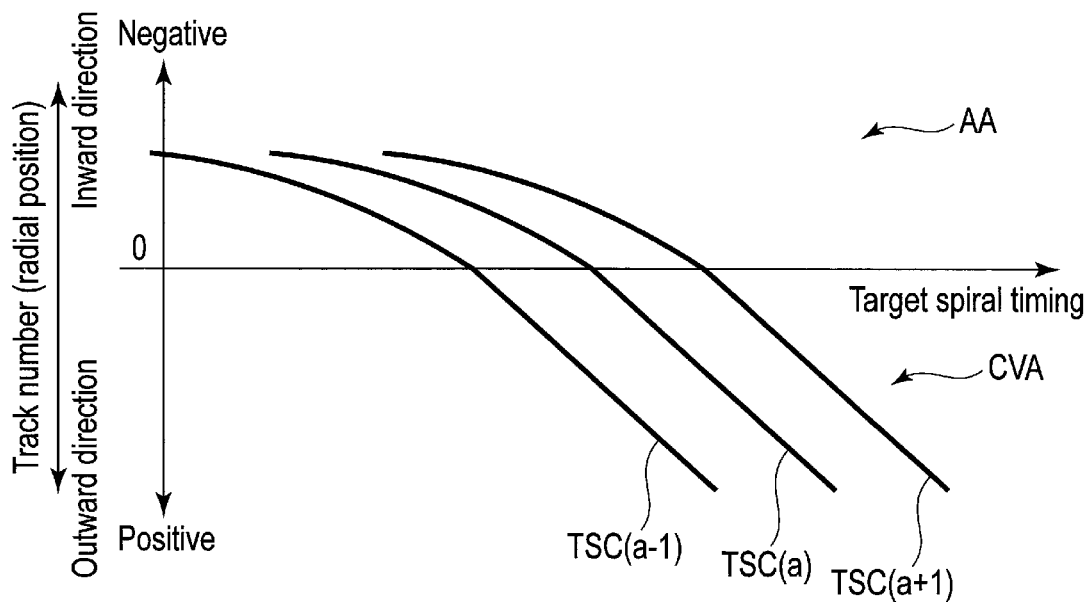
F I G. 11
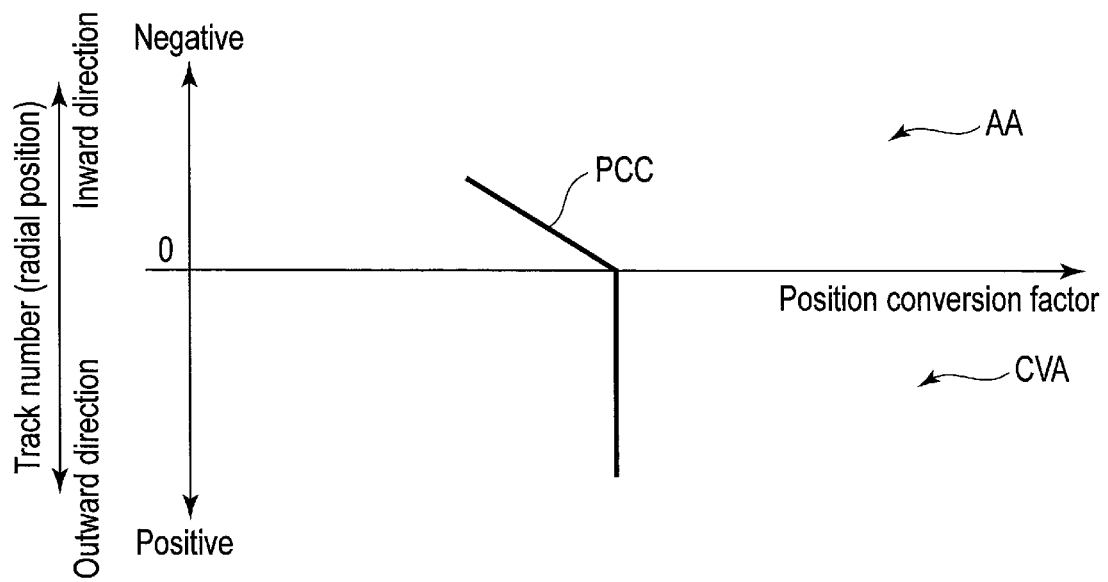
F I G. 12

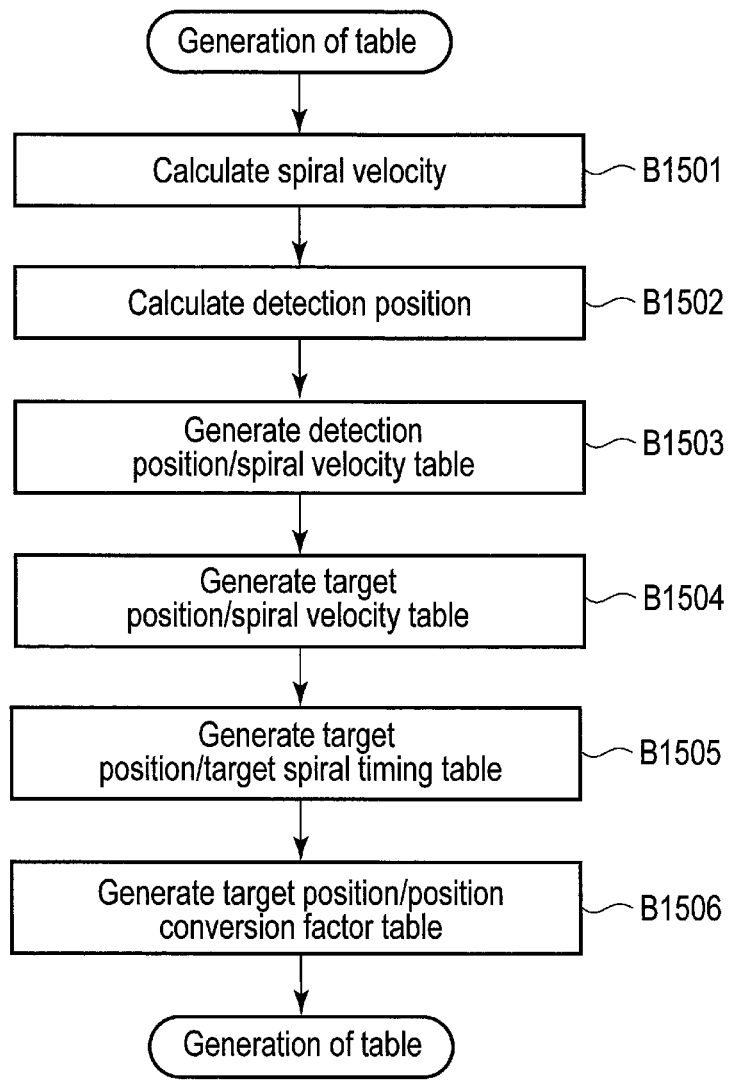
F I G. 15

MAGNETIC DISK DEVICE AND SERVO WRITE METHOD

CROSS-REFERENCE TO RELATED APPLICATIONS

This application is based upon and claims the benefit of priority from Japanese Patent Application No. 2020-048088, filed Mar. 18, 2020, the entire contents of which are incorporated herein by reference.

FIELD

Embodiments described herein relate generally to a magnetic disk device and a servo write method.

BACKGROUND

There is a magnetic disk device that writes a servo pattern to a disk by a self-servo write (SSW) method. The SSW magnetic disk device writes at least one spiral servo pattern to a disk from its inner circumference to its outer circumference based on a seed pattern. The SSW magnetic disk device also writes a final servo pattern radially to a disk based on at least one spiral servo pattern.

BRIEF DESCRIPTION OF THE DRAWINGS

FIG. 1 is a block diagram showing a configuration of a magnetic disk device according to an embodiment.

FIG. 5 is a schematic diagram showing an example of a method of measuring a spiral time interval according to the embodiment.

FIG. 7 shows an example of a detection position/spiral velocity table according to the embodiment.

FIG. 8 shows an example of a target position/spiral velocity table according to the embodiment.

FIG. 9 shows an example of a target position/target spiral timing table according to the embodiment.

FIG. 10 shows an example of a target position/position conversion factor table according to the embodiment.

FIG. 11 is a diagram showing an example of variations of target spiral timing with a track number.

FIG. 12 is a diagram showing an example of variations of a position conversion factor with a track number.

FIG. 15 is a flowchart showing an example of a table generation method according to the embodiment.

DETAILED DESCRIPTION

Figure 2:
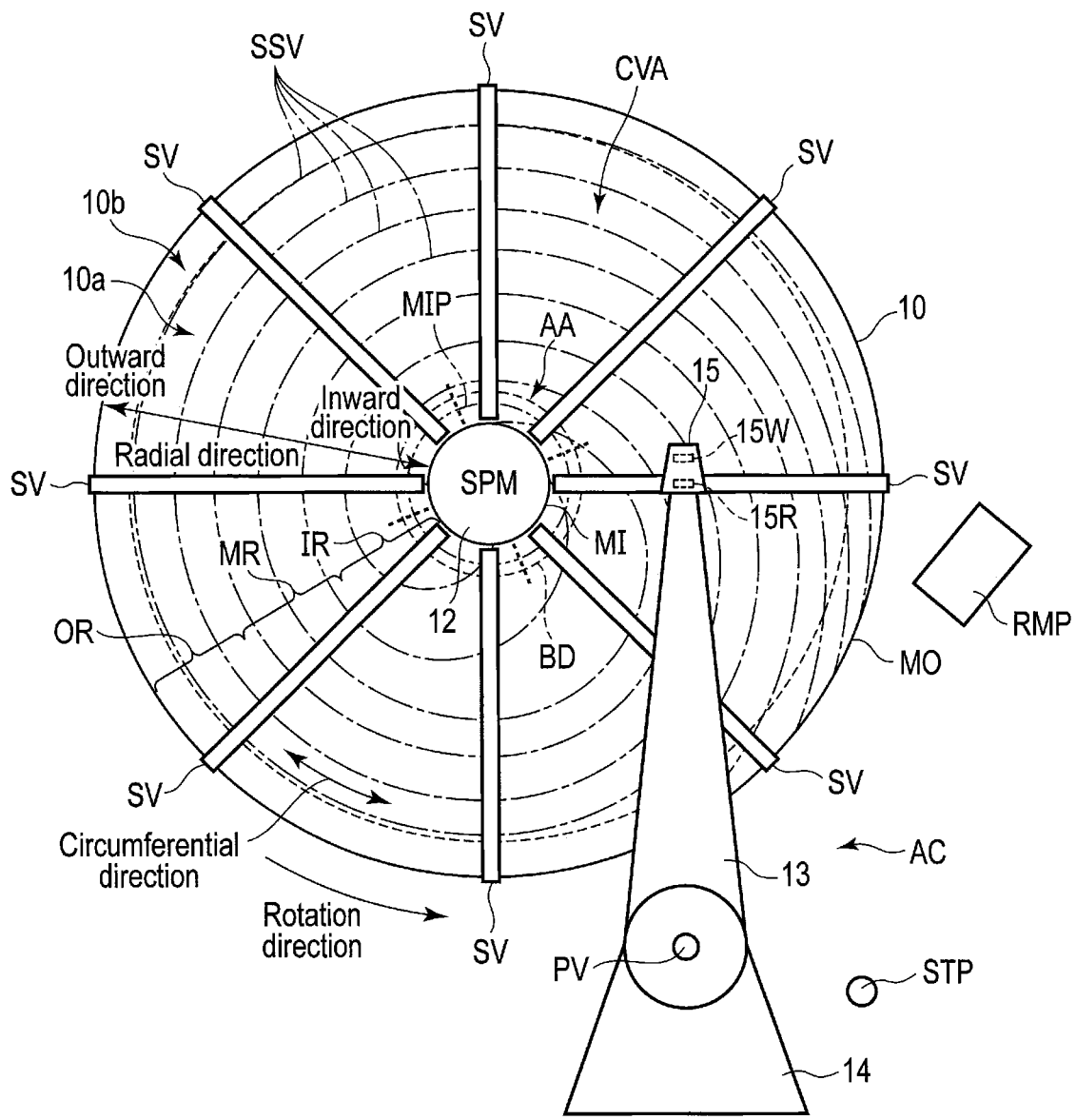
FIG. 2 is a schematic diagram showing an example of a configuration of a disk, a head and their periphery according to the embodiment.

In general, according to one embodiment, a servo write method applied to a magnetic disk device includes a head to write and read data and a disk having a plurality of spiral servo patterns which are written radially in a first direction from a first area to a second area other than the first area at velocity that varies between the first area and the second area, the method comprising: moving the head in a second direction opposite to the first direction to read each of the spiral servo patterns; measuring a plurality of time intervals at which each of the spiral servo patterns is read in the first area; and writing a plurality of servo patterns to the first area based on the time intervals.

An embodiment will be described below with reference to the accompanying drawings. Note that the drawings are one example and do not limit the scope of the invention.

Embodiment

FIG. 1 is a block diagram showing a configuration of a magnetic disk device 1 according to an embodiment.

The magnetic disk device 1 includes a head disk assembly (HAD) to be described later, a driver IC 20, a head amplifier integrated circuit (referred to as a head amplifier IC or a preamplifier hereinafter) 30, a volatile memory 70, a non-volatile memory 80, a buffer memory (buffer) 90, and a system controller 130 which is a one-chip integrated circuit. The magnetic disk device 1 is connected to a host system (referred to as simply a host hereinafter) 100.

The HDA includes a magnetic disk (referred to as a disk hereinafter) 10, a spindle motor (referred to as an SPM hereinafter) 12, an arm 13 on which a head 15 is mounted, and a voice coil motor (referred to as a VCM hereinafter) 14. The disk 10 is attached to the SPM 12 and rotated by driving the SPM 12. The arm 13 and the VCM 14 constitute an actuator AC. The actuator AC moves the head 15, which is mounted on the arm 13, to a particular position on the disk 10 by driving the VCM 14. Two or more disks 10 may be provided, as may be two or more heads 15.

In the disk 10, a user data region 10a to which a user is accessible and a system area 10b to which information necessary for system management is written, are allocated to a region to which data can be written. Hereinafter, the direction from the inner circumference of the disk 10 to the outer circumference thereof or the direction from the outer circumference of the disk 10 to the inner circumference thereof will be referred to as a radial direction. In the radial direction, the direction from the inner circumference to the outer circumference will be referred to as an outward direction (outside), and the direction from the outer circumference to the inner circumference will be referred to as an inward direction (inside). The direction orthogonal to the radial direction of the disk 10 will be referred to as a circumferential direction. The circumferential direction corresponds to a direction along the circumference of the disk 10. In addition, a particular position in the radial direction of the disk 10 may be referred to as a radial position, and a particular position in the circumferential direction of the disk 10 may be referred to as a circumferential position. The radial position and the circumferential position are referred to collectively simply as a position.

The disk 10 is divided into a plurality of regions (also referred to as zones or zone areas) for each particular range in the radial direction. The zones include a plurality of tracks. The tracks include a plurality of sectors. The regions into which the disk 10 is divided in the radial direction may also be referred to as radial regions. The radial regions include the zones, tracks and the like. Note that the term "track" is used to mean one of the regions into which the disk 10 is divided in the radial direction, a path of the head 15 in a particular radial position, data extending in the circumferential direction of the disk 10, data for one round written to the track in a particular radial position, data written to a track, and part of data written to a sector, and has other different meanings. The term "sector" is used to mean one of the regions into which a track is divided in the circumferential direction, data written to the disk 10 in its particular position, and data written to a sector, and has other different meanings. The "with of a track in the radial direction" may also be referred to as "a track width". In addition, the "path passing through the center of a particular track" may also be referred to as "a truck center".

The head 15 includes a write head 15W and a read head 15R mounted on a slider as a main body. The write head 15W writes data onto the disk 10. The read head 15R reads data from a data track on the disk 10. Hereinafter, the phrase "write data, tracks, etc., by the write head 15W" may also be referred to as "write data" or simply as "write" and the phrase "read data, tracks, etc., by the read head 15R" may also be referred to as "read data" or simply as "read".

FIG. 2 is a schematic diagram showing an example of a configuration of the disk 10, the head 15 and their peripheries according to the present embodiment. As shown in FIG. 2, the direction in which the disk 10 rotates in the circumferential direction will be referred to as a rotation direction. In the example shown in FIG. 2, the rotation direction is a counterclockwise direction, but may be an opposite direction (clockwise direction). In FIG. 2, the disk 10 is divided into an inner circumferential region IR located in the inward direction, an outer circumferential region OR located in the outward direction, and a middle circumferential region MR located between the inner and outer circumferential regions IR and OR. In FIG. 2, the system area 10b is placed in the outer circumferential area OR. In FIG. 2, the user data region 10a is placed in the inward direction of the system area 10b. The user data region 10a is placed from the inner circumferential region IR toward the outer circumferential region OR. FIG. 2 shows a ramp RMP to retract the head 15 outside the disk 10, and a stopper STP to inhibit the head 15 from moving too far inside the disk 10. The stopper STP is brought into contact with the VCM 14 rotating around a rotating shaft PV to stop the VCM 14 and thus prevent the VCM 14 from colliding with an inner member such as the shaft (spindle) of the SPM 12. FIG. 2 shows the innermost position (also referred to as the innermost circumferential position hereinafter) MIP at which the head 15 is disposed in the radial direction. The head 15 is located at the innermost circumferential position MIP, for example, when the VCM 14 is brought into contact with the stopper STP. FIG. 2 also shows an acceleration area AA placed in the inner circumferential region IR and a constant velocity area CVA placed from the inner circumferential region IR toward the outer circumferential region OR. Furthermore, FIG. 2 shows a radial position (also referred to simply as a boundary) BD corresponding to the boundary between the acceleration area AA and the constant velocity area CVA. In FIG. 2, the acceleration area AA corresponds to an area with a particular range in the outward direction from the innermost circumference MI of the disk 10. If the radial-direction length (diameter) from the innermost circumference MI to the outermost circumference MO of the disk 10 falls with, for example, the range of 20 mm to 40 mm, the radial-direction length (width) of the acceleration area AA falls within the range of 0.1 mm to 0.5 mm. The acceleration area AA includes the innermost circumferential position MIP. The constant velocity area CVA is placed in the outward direction of the acceleration area AA of the disk 10. For example, the constant velocity area CVA is adjacent to the acceleration area AA of the disk 10 in its outward direction.

The disk 10 includes at least one spiral servo pattern (also referred to as a spiral servo region hereinafter) SSV. In the example of FIG. 2, the disk 10 includes a plurality of spiral servo patterns SSV. Each of the spiral servo patterns SSV is written spirally from the inner circumferential region IR to the outer circumferential region OR of the disk 10. For example, the spiral servo patterns SSV are spirally written outward from the circumferential positions which are arranged at particular intervals in the circumferential direction at the innermost circumferential position IP. The particular intervals are, for example, constant intervals. Assume here that for example, 10 spiral servo patterns SSV are written onto the surface of one of a plurality of disks 10, 32 spiral servo patterns SSV are written onto the opposite surface of the disk, 280 spiral servo patterns SSV are written onto the surfaces of the other disks 10, and the spiral servo patterns SSV are written while gradually increasing the number of spiral servo patterns. In FIG. 2, four spiral servo patterns SSV are written to the disk 10, but three or less spiral servo patterns SSV may be written to the disk 10 or five or more spiral servo patterns SSV may be written to the disk 10.

The disk 10 includes a plurality of servo patterns (which may be referred to as servo regions) SV. The servo patterns SV correspond to the final servo patterns (which may be referred to as product servo patterns hereinafter) which are written to the disk 10 based on the spiral servo patterns SSV. The servo regions SV extend radially in the radial direction of the disk 10 and are arranged discretely at particular intervals or constant intervals in the circumferential direction. Hereinafter, one servo pattern SV in a particular track may also be referred to as "a servo sector". Note that the servo pattern SV may also be referred to as a servo sector SV. The servo sector includes servo data. Note that "the servo data written to the servo sector" may also be referred to as "a servo sector".

The actuator AC controls the movement of the head 15, which is provided at the distal end of the arm 13, to a particular position on the disk 10 by rotating the VCM 14 around the rotating shaft PV. Moving the head 15 from the ramp RMP onto the disk 10 may also be referred to as loading, and moving the head 15 from the disk 10 to the ramp RMP may also be referred to as unloading. Hereinafter, the "direction in which the head 15 is loaded" will also be referred to as "load direction" and the "direction opposite to the load direction" will also be referred to as "unload direction". The load direction corresponds to, for example, the inward direction in the radial direction, and the unload direction corresponds to, for example, the outward direction in the radial direction. The actuator AC controls the movement of the head 15 in the load or unload direction by driving the VCM 14 around the rotating shaft PV. In the example shown in FIG. 2, the actuator AC moves the head 15 in a range from the outermost circumference MO of the disk 10 (or the ramp RMP outside the disk 10) to the innermost circumferential position MIP where the VCM 14 is in contact with the stopper STP.

The driver IC 20 controls driving of the SPM 12 and the VCM 14 under the control of the system controller 130 (which is an MPU 60 to be described in detail later).

The head amplifier IC (preamplifier) 30 includes a read amplifier and a write driver. The read amplifier amplifies a read signal read from the disk 10 and outputs the amplified read signal to the system controller 130 (which is a read/write (R/W) channel 40 to described in detail later). The write driver outputs a write current to the head 15 in response to the signal output from the R/W channel 40.

The volatile memory 70 is a semiconductor memory from which data is lost when power supply is cut off. The volatile memory 70 stores data necessary for processing in each unit of the magnetic disk device 1. The volatile memory 70 is, for example, a dynamic random access memory (DRAM) or a synchronous dynamic random access memory (SDRAM).

The nonvolatile memory 80 is a semiconductor memory that stores recorded data even when power supply is cut off. The nonvolatile memory 80 is, for example, a NOR or NAND flash read only memory (FROM).

The buffer memory 90 is a semiconductor memory that temporarily records data and the like transmitted and received between the magnetic disk device 1 and the host 100. Note that the buffer memory 90 may be configured integrally with the volatile memory 70 as one unit. The buffer memory 90 is, for example, a DRAM, a static random access memory (SRAM), an SDRAM, a ferroelectric random access memory (FeRAM), or a magnetoresistive random access memory (MRAM).

The system controller (controller) 130 is implemented using, for example, a large-scale integrated circuit (LSI) such as a system-on-a-chip (SoC) in which a plurality of elements are integrated on a single chip. The system controller 130 includes a read/write (R/W) channel 40, a hard disk controller (HDC) 50 and a microprocessor (MPU) 60. The system controller 130 is electrically connected to the driver IC 20, head amplifier IC 30, volatile memory 70, nonvolatile memory 80, buffer memory 90 and host system 100.

The R/W channel 40 performs signal processing of read data transferred from the disk 10 to the host 100 and write data transferred from the host 100 in response to an instruction from the MPU 60 to be described later. The R/W channel 40 has a circuit or a function for measuring signal quality of read data. The R/W channel 40 is electrically connected to, for example, the head amplifier IC 30, HDC 50, MPU 60 and the like.

The HDC 50 controls data transfer between the host 100 and the R/W channel 40 in response to an instruction from the MPU 60 to be described later. The HDC 50 is electrically connected to, for example, the R/W channel 40, MPU 60, volatile memory 70, nonvolatile memory 80, buffer memory 90 and the like.

The MPU 60 is a main controller that controls each unit of the magnetic disk device 1. The MPU 60 controls the VCM 14 through the driver IC 20 to perform servo control for positioning the head 15. The MPU 60 controls write of data to the disk 10 and selects a destination to store write data. The MPU 60 also controls read of data from the disk 10 and controls processing of read data. The MPU 60 is connected to each unit of the magnetic disk device 1. The MPU 60 is electrically connected to, for example, the driver IC 20, R/W channel 40, HDC 50 and the like.

The MPU 60 includes a read/write controller 610, a spiral servo write controller 620, a measurement unit 630 and a servo write controller 640. The MPU 60 performs processes of these units and the like on firmware. Note that the MPU 60 may include these units and the like as circuits.

The read/write controller 610 controls a data read process and a data write process in response to a command or the like from the host 100. The read/write controller 610 also controls the VCM 14 through the driver IC 20 and places the head 15 at a particular radial position on the disk 10 to perform a read process or a write process. Hereinafter, the "read process" and "write process" may also be referred to collectively as "access" or "access process".

The spiral servo write controller 620 writes a plurality of spiral servo patterns SSV to the disk 10. For example, the spiral servo write controller 620 writes a plurality of spiral servo patterns SSV to the disk 10 based on a seed pattern written to part of the inner circumference and/or the outer circumference of the disk 10 by a dedicated device (e.g., a servo track writer (STW) for each disk) in the servo write process at the time of manufacture.

The spiral servo write controller 620 writes each spiral servo pattern SSV to the disk 10 toward the unload direction from the circumferential positions located at particular intervals in the circumferential direction at the innermost circumferential position MIP. In other words, the spiral servo write controller 620 writes each spiral servo pattern SSV to the disk 10, which rotates at a given number of revolutions, for example, 7200 revolutions per minute (rpm) while moving the head 15 on the disk 10 in the unload direction from the circumferential positions located at particular intervals in the circumferential direction at the innermost circumferential position MIP.

The spiral servo write controller 620 can write each spiral servo pattern SSV spirally to the disk 10 at speed that varies between the acceleration area AA and the constant velocity area CVA from the innermost circumferential position MIP toward the unload direction. When the spiral servo write controller 620 writes each spiral servo pattern SSV to the disk 10 from the innermost circumferential position MIP toward the unload direction, the spiral servo pattern SSV is written to the acceleration area AA of the disk 10 while the head 15 is gradually accelerating until its speed reaches a target speed during a particular time period (also referred to as an acceleration time period hereinafter). After the acceleration time period, each spiral servo pattern SSV is written to the constant velocity area CVA of the disk 10 by the head 15 at the target speed. In other words, when the spiral servo write controller 620 writes each spiral servo pattern SSV from the innermost circumferential position MIP toward the unload direction, the spiral servo pattern SSV is written by the head 15 that accelerates until its speed reaches the target speed in the acceleration area AA, and the spiral servo pattern SSV is written by the head 15 at the target speed in the constant velocity area CVA. For example, when the spiral servo pattern controller 620 writes each spiral servo pattern SSV from the innermost circumferential position MIP toward the unload direction, the spiral servo pattern SSV is written by the head 15 that accelerates until its speed reaches the target speed in the acceleration area AA, and the spiral servo pattern SSV is written by the head 15 at the target speed based on information of back electromotive force and the like from the VCM 14 from the SPM 12 in the constant velocity area CVA. The acceleration area AA corresponds to an area in which the head 15 moves during the acceleration time period when each spiral servo pattern SSV is written from the innermost circumferential position MIP toward the unload direction, that is, an area in which the head 15 is gradually accelerating to the target speed. The constant velocity area CVA corresponds to an area in which the head 15 can move at a constant speed (e.g., target speed) when each spiral servo pattern SSV is written from the innermost circumferential position MIP toward the unload direction.

When the spiral servo write controller 620 writes the spiral servo patterns SSV from the innermost circumferential position MIP toward the unload direction, it writes a spiral servo pattern SSV of a particular synchronization (or sync) pattern (which may be referred to as a first synch pattern hereinafter) to the disk 10 in the acceleration area AA and writes a spiral servo pattern SSV of a sync pattern other than the first synch pattern (which may be referred to as a second synch pattern hereinafter) to the disk 10 in the constant velocity area CVA. For example, the polarities of the first and second sync patterns are opposite to each other. In other words, the polarity of a sync signal when the first sync pattern is read (which may be referred to as a first sync signal hereinafter) and the polarity of a sync signal when the second sync pattern is read (which may be referred to as a second sync signal hereinafter) are opposite to each other.

For example, the spiral servo write controller 620 writes at least one of the spiral servo patterns (which may be referred to as a reference spiral servo pattern) SSV in a sync pattern other than the synch patterns of the other spiral servo patterns SSV. For example, the polarity of the sync pattern of the reference spiral servo pattern SSV and the polarity of the sync pattern of a spiral servo pattern SSV other than the reference spiral servo patterns SSV are opposite to each other. The reference spiral servo pattern SSV is used as a mark when, for example, a final servo pattern (product servo pattern) is written.

Figure 3:
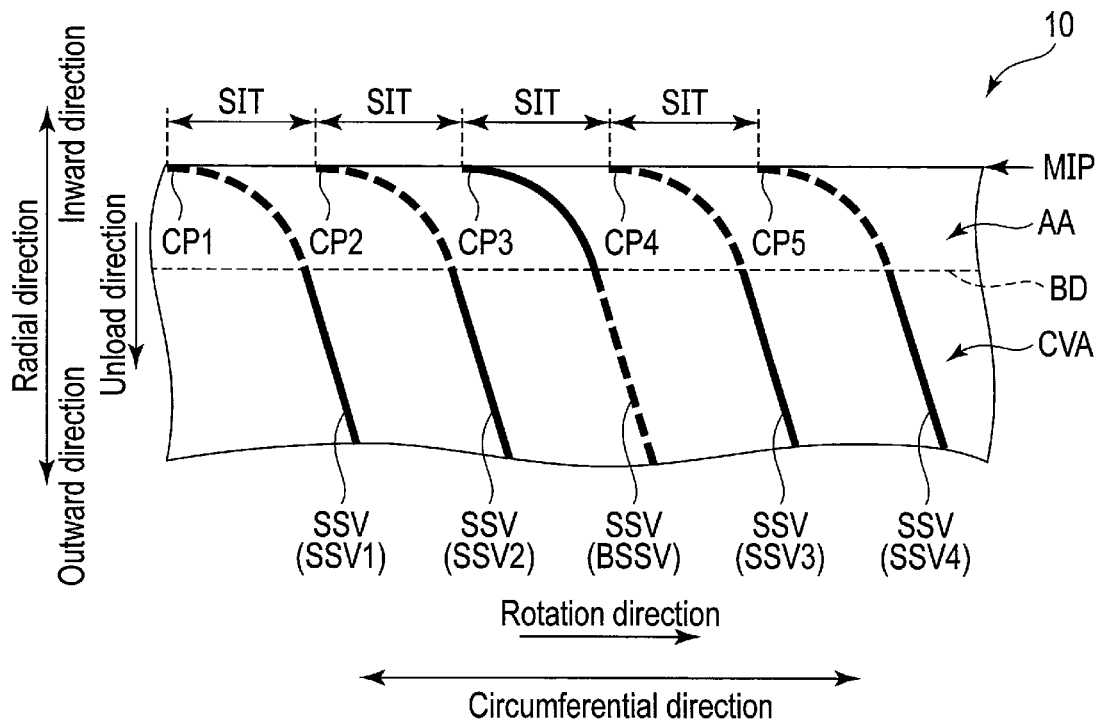
FIG. 3 is a schematic diagram showing an example of spiral servo patterns.

FIG. 3 is a schematic diagram showing an example of the spiral servo patterns SSV. Specifically, FIG. 3 shows a plurality of spiral servo patterns SSV1, SSV2, BSSV, SSV3 and SSV4. Of these spiral servo patterns, the spiral servo pattern BSSV corresponds to a reference spiral servo pattern. The spiral servo patterns SSV extends outwardly from a plurality of circumferential positions CP1, CP2, CP3, CP4 and CP5 which are circumferentially spaced at intervals SIT at the innermost circumferential position MIP. Each of the spiral servo patterns SSV1, SSV2, BSSV, SSV3 and SSV4 is curved nonlinearly in the acceleration area AA and extends linearly in the constant velocity area CVA. For example, the spiral servo patterns SSV1, SSV2, BSSV, SSV3 and SSV4 are arranged at regular intervals in the circumferential direction in the constant velocity area CVA. The broken-line portions and solid-line portions of the spiral servo patterns SSV1, SSV2, BSSV, SSV3 and SSV4 differ in sync pattern. For example, the broken-line portions correspond to the first sync pattern, and the solid-line portions correspond to the second sync pattern. In the example shown in FIG. 3, for convenience of description, the innermost circumferential position MIP of the disk 10 is shown linearly along the circumferential direction, but the innermost circumferential position MIP is actually curved along the circumferential direction and thus the spiral patterns SSV1, SSV2, BSSV, SSV3 and SSV4 sharply curve in the acceleration area AA and extend helically to curve at a fixed amount of variation in the constant velocity area CVA. In FIG. 3, five spiral servo patterns SSV are written to the disk 10, but four or less spiral servo patterns SSV may be written to the disk 10, or six or more spiral servo patterns SSV may be written to the disk 10.

In the example shown in FIG. 3, the spiral servo write controller 620 writes the spiral servo patterns SSV1, SSV2, BSSV, SSV3 and SSV4 to the disk 10 while moving the head 15 in the unload direction from the circumferential positions CP1, CP2, CP3, CP4 and CP5, which are arranged at intervals SIT in the circumferential direction at the innermost circumferential position MIP, on the disk 10 rotating at a particular rotational speed.

The spiral servo write controller 620 writes a spiral pattern SSV1 of the first sync pattern to the disk 10 by the head 15 which accelerates until it reaches a target speed in the acceleration area AA, and writes a spiral servo pattern SSV1 of the second sync pattern to the disk 10 by the head 15 at the target speed in the constant velocity area CVA.

The spiral servo write controller 620 writes a spiral servo pattern SSV2 of the first sync pattern to the disk 10 by the head 15 which accelerates until it reaches a target speed in the acceleration area AA, and writes a spiral servo pattern SSV2 of the second sync pattern to the disk 10 by the head 15 at the target speed in the constant velocity CVA.

The spiral servo write controller 620 writes a reference spiral servo pattern BSSV of the second sync pattern to the disk 10 by the head 15 which accelerates until it reaches a target speed in the acceleration area AA, and writes a reference spiral servo pattern BSSV of the first sync pattern to the disk 10 by the head 15 at the target speed in the constant velocity area CVA.

The spiral servo write controller 620 writes a spiral servo pattern SSV3 of the first sync pattern to the disk 10 by the head 15 which accelerates until it reaches a target speed in the acceleration area AA, and writes a spiral servo pattern SSV3 of the second sync pattern to the disk 10 by the head 15 at the target speed in the constant velocity CVA.

The spiral servo write controller 620 writes a spiral servo pattern SSV4 of the first sync pattern to the disk 10 by the head 15 which accelerates until it reaches a target speed in the acceleration area AA, and writes a spiral servo pattern SSV4 of the second sync pattern to the disk 10 by the head 15 at the target speed in the constant velocity area CVA.

Figure 4:
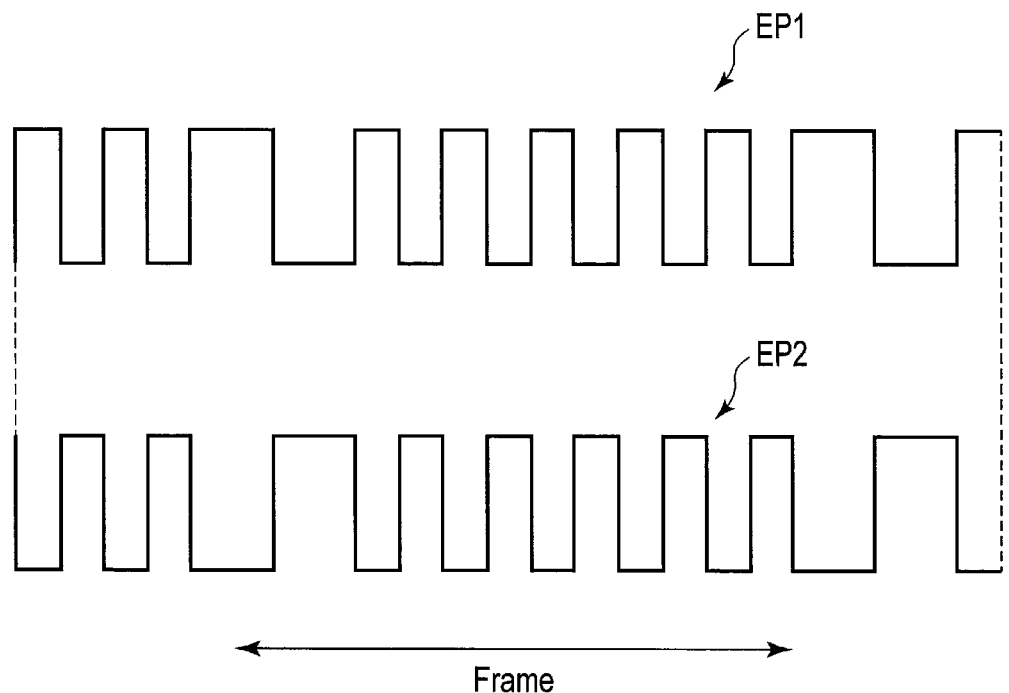
FIG. 4 is a schematic diagram showing an example of a first sync signal and a second sync signal.

FIG. 4 is a schematic diagram showing an example of the first and second sync signals. In FIG. 4, the horizontal axis indicates a frame (which may be referred to as a frame direction). FIG. 4 also shows a first sync signal EP1 and a second sync signal EP2. The levels of the first and second sync signals EP1 and EP2 are high when the signals rise, and the levels are low when they fall.

In the example shown in FIG. 4, the polarities of the first and second sync signals are opposite to each other. Each of the first and second sync signals has a portion that is longer than that of their surrounding signals in the frame direction for synchronization.

The measurement unit 630 moves the head 15 in one direction at a constant speed to scan (or read) and demodulate the spiral servo patterns SSV and measure a plurality of time intervals (which may be referred to as spiral time intervals or radial spiral time intervals) at which the head 15 scans adjacent two of the spiral servo patterns SSV in one direction at a constant speed. Here, the term "adjacent" means not only that data items, objects, regions, spaces and the like are arranged in contact with each other, but also that they are arranged at particular intervals. The term "scan" means "read", "read and detect" and the like. Hereinafter, the term "scan" may be referred to as "read". The phrase "scan (or read) and demodulate particular data" may be referred simply as "scan (or read)". The phrase "speed of the scanning head 15" may be referred to as "scanning velocity". In addition, the phrase "process of scanning and measuring the spiral servo patterns SSV" may be referred to as "scanning process".

The measurement unit 630 moves the head 15 at a constant scanning velocity in a direction opposite to the direction (unload direction) in which a spiral servo pattern SSV is written, for example, in the load direction to scan a plurality of spiral servo patterns SSV and detect a constant velocity area CVA from the sync pattern. In the constant velocity area CVA, the measurement unit 630 moves the head 15 in the load direction at a constant scanning velocity to scan a plurality of spiral servo patterns SSV and measure a plurality of spiral time intervals in the spiral servo patterns SSV. Hereinafter, the "spiral time intervals in the constant velocity area CVA" may be referred to as "constant velocity spiral time intervals" or "radial constant velocity spiral time Intervals. The constant velocity spiral time intervals are regular, for example, in each combination of adjacent two of the spiral servo patterns SSV in the constant velocity area CVA. The measurement unit 630 moves the head 15 in the load direction at a constant scanning velocity to scan a plurality of spiral servo patterns SSV and detect an acceleration area AA from the sync pattern. In the acceleration area AA, the measurement unit 630 moves the head 15 in the load direction at a constant scanning velocity to scan a plurality of spiral servo patterns SSV and measure a plurality of spiral time intervals in the spiral servo patterns SSV. Hereinafter, the "spiral time intervals in the acceleration area AA" may be referred to as "acceleration spiral time intervals" or "radial acceleration spiral time intervals". The acceleration spiral time intervals may vary, for example, in each combination of adjacent two of the spiral servo patterns SSV in the acceleration area AA.

The measurement unit 630 generates a table for writing a product servo pattern to the constant velocity area CVA and the acceleration area AA based on the spiral time intervals. Note that the measurement unit 630 may generate a table for writing a product servo pattern only to the acceleration area AA based on the spiral time intervals. The measurement unit 630 records the generated table in a particular recording area, such as the system area 10b of the disk 10, the volatile memory 70, and the nonvolatile memory 80.

For example, the measurement unit 630 loads the head 15 onto the disk 10 from the ramp RMP with sector timing synchronized with a clock of rotation of an optional SPM 12 and moves the head 15 in the load direction at a constant scanning velocity of, for example, 0.1 to 0.15 m/s to scan a plurality of spiral servo patterns SSV and detect a constant velocity area CVA from the sync pattern. The measurement unit 630 moves the head 15 in the load direction at a constant scanning velocity of, for example, 0.1 to 0.15 m/s in the constant velocity area CVA to scan a plurality of spiral servo patterns SSV and measure a plurality of spiral time intervals (constant velocity spiral time intervals or radial constant velocity spiral time intervals) in the scanned spiral servo patterns SSV. The measurement unit 630 moves the head 15 in the load direction at a constant scanning velocity of, for example, 0.1 to 0.15 m/s to scan a plurality of spiral servo patterns SSV and detect an acceleration area AA from the sync pattern. The measurement unit 630 moves the head 15 in the load direction at a constant scanning velocity of, for example, 0.1 to 0.15 m/s in the acceleration area AA to scan a plurality of spiral servo patterns SSV and measure a plurality of spiral time intervals (acceleration spiral time intervals or radial acceleration spiral time intervals) in the scanned spiral servo patterns SSV.

The measurement unit 630 calculates the circumferential velocity of each spiral servo pattern SSV at each radial position (also referred to as spiral velocity hereinafter) based on each spiral time interval measured by scanning the spiral servo pattern SSV. Hereinafter, the "spiral velocity in the constant velocity area CVA" may be referred to as "constant spiral velocity" and the "spiral velocity in the acceleration area AA" may be referred to as "acceleration spiral velocity". For example, the measurement unit 630 calculates spiral velocity SVE by the following equation:

$$SVE = dTs \times v0 / (dTf - dTs) \qquad (1)$$

where SVE is spiral velocity, dTs is a spiral time interval (radial spiral time interval), v0 is scanning velocity, and dTf is a particular radial position of the head 15, e.g., a spiral time interval when the head 15 is tracked to a particular track in the constant velocity area CVA (which may be referred to as a constant velocity spiral time interval or a circumferential constant velocity spiral time interval hereinafter). For example, the circumferential constant velocity spiral time interval dTf is a constant.

The measurement unit 630 calculates each radial position (which may be referred to as a detection position hereinafter) in which each spiral servo pattern SSV is scanned based on a spiral time interval measured by scanning the spiral servo pattern SSV. For example, the measurement unit 630 calculates a detection position y by the following equation:

$$y(n) = y(n-1) + v0 \times dTs \qquad (2)$$

where n is an identification number of the spiral servo pattern SSV scanned in the scanning process (the identification number may be referred to as a scanned spiral servo pattern number or simply as a spiral servo pattern number hereinafter, and the spiral servo pattern may be referred to as a scanned spiral servo pattern hereinafter), y(n) corresponds to a detection position (or scanning position) of the scanned spiral servo pattern SSV with scanned spiral servo pattern number n, and y(n−1) corresponds to a detection position of the scanned spiral servo pattern with scanned spiral servo pattern number n−1 one before the scanned spiral servo pattern number n. For example, n=0 is a scanned spiral servo pattern number corresponding to the spiral servo pattern SSV scanned immediately after a sync signal (or sync pattern) of the constant velocity area CVA is switched to a sync signal (or sync pattern) of the acceleration area AA.

Based on the spiral velocity SVE calculated by the equation (1) and the detection position y calculated by the equation (2), the measurement unit 630 generates a table showing the relationship between the spiral velocity SVE and the detection position y (which may be referred to as a detection position/spiral velocity table hereinafter). Based on the detection position/spiral velocity table, the measurement unit 630 generates a table of acceleration spiral velocity (which may be referred to as a target position/spiral velocity table hereinafter) through an interpolation process such as linear interpolation for each target radial position (which may be referred to as a target position hereinafter) at which the head 15 is provided, for example, for each track with a target track number for tracking the head 15 (which may be referred to as a target track).

When the head 15 is located at a target position based on the target position/spiral velocity table, the measurement unit 630 generates a table (which may be referred to as a target position/target spiral timing table hereinafter) showing the relationship between the target position and the timing (which may be referred to as target spiral timing hereinafter) with which the head 15 is located at a spiral servo pattern (which may be referred to as a target spiral servo pattern hereinafter) SSV targeted, for example, when the head 15 is tracked to the target track. For example, the measurement unit 630 generates a target spiral timing table based on the target position/spiral velocity table and the following equation for calculating the target spiral timing dTts:

$$dTts(m) = dTts(m-1) + dx \times SV \qquad (3)$$

where m is an identification number of the target spiral pattern SSV (which may be referred to as a target spiral servo pattern number or simply as a spiral servo pattern number hereinafter), dTts(m) corresponds to target spiral timing when the head 15 is located at a target position, for example, the target spiral servo pattern SSV with target spiral servo pattern number m, dTts(m−1) corresponds to target spiral timing when the head 15 is located at a target position, for example, a target spiral servo pattern SSV with target spiral servo pattern number m−1 one before the target spiral servo pattern number m, and dx is a radial distance between the target spiral servo pattern with target spiral servo pattern number n and the target spiral servo pattern SSV with target spiral servo pattern number n−1. For example, m=0 is a target spiral servo pattern number corresponding to the target spiral servo pattern SSV immediately after a sync signal (or a sync pattern) of the constant velocity area CVA is switched to a sync signal (or a sync pattern) of the acceleration area AA.

Based on the target position/spiral velocity table, the measurement unit 630 generates a table showing the relationship between a target position and a position conversion factor (which may be referred to as a target position/position conversion factor table hereinafter). For example, the measurement unit 630 generates the target position/position conversion factor table based on the target position/spiral velocity table and the following equation for calculating the position conversion factor (which may be referred to as a servo gain) SG. The position conversion factor corresponds to a factor for converting timing corresponding to a plurality of spiral servo patterns SSV at each radial position. For example, the position conversion factor corresponds to a factor for timing corresponding to a plurality of spiral servos in each radial position of the acceleration area AA, for example, in each track with a track number.

$$SG = SV/SVC \quad (4)$$

where SVC is a constant spiral velocity.

FIG. 5 is a schematic diagram showing an example of a method for measuring a spiral time interval according to the present embodiment. FIG. 5 corresponds to FIG. 3. FIG. 5 shows paths (which may be referred to as scanning paths hereinafter) SP1 and SP2 scanned by the head 15. In FIG. 5, the scanning path SP1 corresponds to a path of the head 15 that scans the spiral servo patterns SSV4 and SSV3 in the load direction in the constant velocity area CVA. The scanning path SP2 corresponds to a path of the head 15 that scans the spiral servo patterns SSV2 and SSV1 in the load direction in the acceleration area AA. FIG. 5 also shows a spiral time interval (constant velocity spiral time interval) dTs1 measured by scanning the head 15 along the scanning path SP1 and a spiral time interval (acceleration spiral time interval) dTs2 measured by scanning the head 15 along the scanning path SP2.

In the example shown in FIG. 5, the measurement unit 630 moves the head 15 at a constant velocity in the load direction in the constant velocity area CVA to scan the spiral servo patterns SSV4 and SSV3 along the scanning path SP1 and measure the spiral time interval (constant velocity spiral time interval) dTs1 of the spiral servo patterns SSV4 and SSV3.

In the example shown in FIG. 5, the measurement unit 630 moves the head 15 at a constant velocity in the load direction in the acceleration area AA to scan the spiral servo patterns SSV2 and SSV1 along the scanning path SP2 and measure the spiral time interval (acceleration spiral time interval) dTs2 of the spiral servo patterns SSV2 and SSV1.

Figure 6:
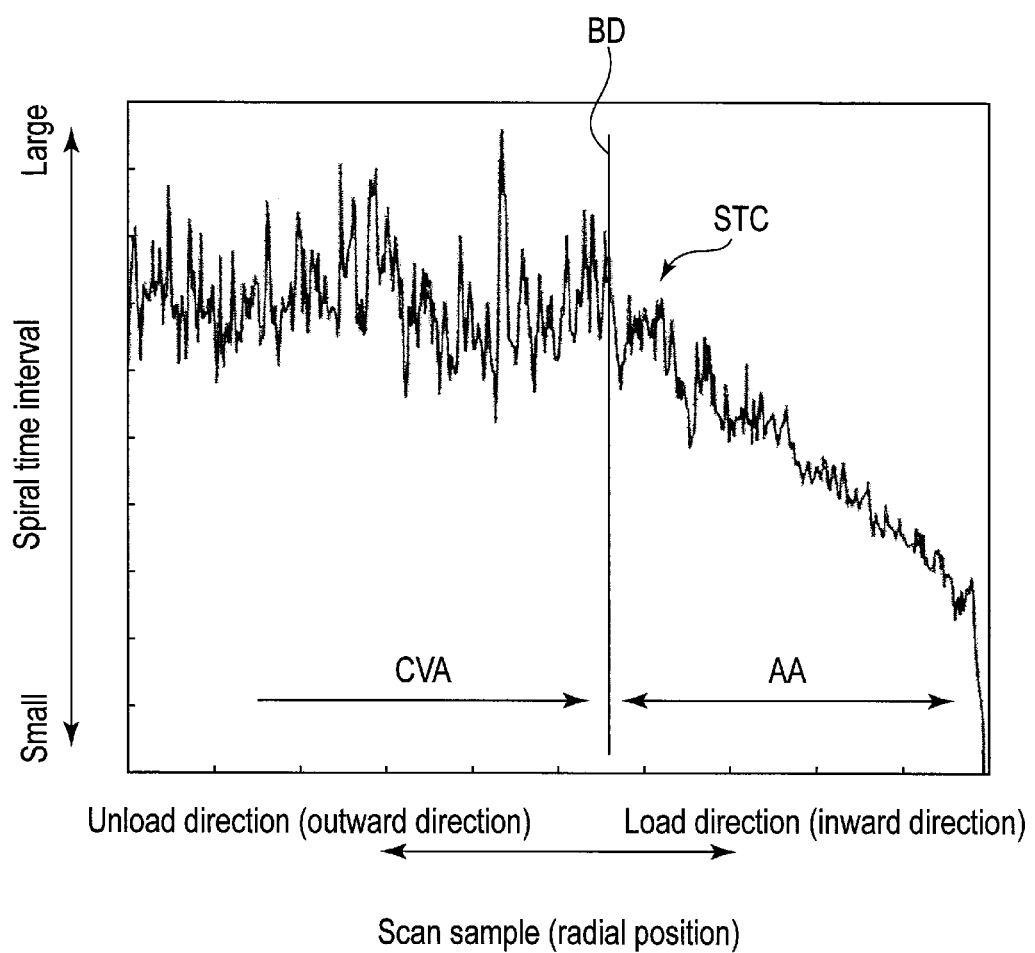
FIG. 6 is a diagram showing an example of variations of the spiral time interval with a scan sample.

FIG. 6 is a diagram showing an example of variations STC of the spiral time interval with a scan sample. In FIG. 6, the vertical axis represents the spiral time interval and the horizontal axis represents the scan sample such as a combination of adjacent two spiral servo patterns SSV at a particular radial position. In the vertical axis of FIG. 6, the spiral time interval increases toward the "large" direction of the double-headed arrow, and decreases toward the "small" direction thereof. In the horizontal axis of FIG. 6, an area in the load direction (inward direction) from boundary BD corresponds to the acceleration area AA, and an area in the unload direction (outward direction) from boundary BD corresponds to the constant velocity area CVA. The variations STC of the spiral time interval with a scan sample in FIG. 6 may be referred to as simply spiral time interval variations STC.

In the example shown in FIG. 6, the spiral time interval variations STC are substantially constant in the constant velocity area CVA, but decrease toward the load direction in the acceleration area AA.

FIG. 7 shows an example of a detection position/spiral velocity table TB1 according to the present embodiment. The detection position/spiral velocity table TB1 includes spiral time intervals . . . , dTs(k−1), dTs(k), dTs(k+1), . . . , spiral velocities . . . , SV(k−1), SVk, SV(k+1), . . . which correspond to the spiral time intervals, and detection positions . . . , y(k−1), y(k), y(k+1), . . . which correspond to the spiral time intervals. In FIG. 7, the spiral velocity SVE(k−1) corresponds to the spiral time interval dTs(k+1), the spiral velocity SVE(k) corresponds to the spiral time interval dTs(k), and the spiral velocity SVE(k+1) corresponds to the spiral time interval dTs(k+1). In FIG. 7, the detection position y(k−1) corresponds to the spiral time interval dTs(k−1), the detection position y(k) corresponds to the spiral time interval dTs(k), and the detection position y(k+1) corresponds to the spiral time interval dTs(k+1).

The measurement unit 630 calculates a spiral velocity SVE(k−1) based on the equation (1) and the spiral time interval dTs(k−1). The measurement unit 630 records the calculated spiral velocity SVE(k−1) in the area of the spiral velocity corresponding to the spiral time interval dTs(k−1) of the detection position/spiral velocity table TB1. The measurement unit 630 calculates a detection position y(k−1) based on the equation (2) and the spiral time interval dTs(k−1). The measurement unit 630 records the calculated detection position y(k−1) in the area of the detection position corresponding to the spiral time interval dTs(k−1) of the detection position/spiral velocity table TB1.

The measurement unit 630 calculates a spiral velocity SVE(k) based on the equation (1) and the spiral time interval dTs(k). The measurement unit 630 records the calculated spiral velocity SVE(k) in the area of the spiral velocity corresponding to the spiral time interval dTs(k) of the detection position/spiral velocity table TB1. The measurement unit 630 calculates a detection position y(k) based on the equation (2) and the spiral time interval dTs(k). The measurement unit 630 records the calculated detection position y(k) in the area of the detection position corresponding to the spiral time interval dTs(k) of the detection position/spiral velocity table TB1.

The measurement unit 630 calculates a spiral velocity SVE(k+1) based on the equation (1) and the spiral time interval dTs(k+1). The measurement unit 630 records the calculated spiral velocity SVE(k+1) in the area of the spiral velocity corresponding to the spiral time interval dTs(k+1) of the detection position/spiral velocity table TB1. The measurement unit 630 calculates a detection position y(k+1) based on the equation (2) and the spiral time interval dTs(k+1). The measurement unit 630 records the calculated detection position y(k+1) in the area of the detection position corresponding to the spiral time interval dTs(k+1) of the detection position/spiral velocity table TB1.

FIG. 8 shows an example of a target position/spiral velocity table TB2 according to the present embodiment. FIG. 8 corresponds to, for example, FIG. 7. The target position/spiral velocity table TB2 of FIG. 8 includes target positions . . . , TP(s−1), TP(s), TP(s+1), . . . , target track numbers . . . , TN(s−1), TN(s), TN(s+1), . . . which corresponds to the target positions, and spiral velocities . . . , SV(s−1), SV(s), SV(s+1), . . . which correspond to the target positions. In FIG. 8, the track number TN(s−1) corresponds to the target position TP(s−1), the track number TN(s) corresponds to the target position TP(s), and the track number TN(s+1) corresponds to the target position TP(s+1). In FIG. 8, the spiral velocity SVE(s−1) corresponds to the target position TP(s−1), the spiral velocity SVE(s) corresponds to the target position TP(s), and the spiral velocity SVE(s+1) corresponds to the target position TP(s+1).

In the example shown in FIG. 8, the measurement unit 630 calculates a spiral velocity SVE(s−1) corresponding to the target position TP(s−1) by linear interpolation or the like based on the detection position/spiral velocity table TB1 shown in FIG. 7. The measurement unit 630 records the calculated spiral velocity SVE(s−1) in the area of the spiral velocity corresponding to the target position TP(s−1) of the target position/spiral velocity table TB2.

In the example shown in FIG. 8, the measurement unit 630 calculates a spiral velocity SVE(s) corresponding to the target position TP(s) by linear interpolation or the like based on the detection position/spiral velocity table TB1 shown in FIG. 7. The measurement unit 630 records the calculated spiral velocity SVE(s) in the area of the spiral velocity corresponding to the target position TP(s) of the target position/spiral velocity table TB2.

In the example shown in FIG. 8, the measurement unit 630 calculates a spiral velocity SVE(s+1) corresponding to the target position TP(s+1) by linear interpolation or the like based on the detection position/spiral velocity table TB1 shown in FIG. 7. The measurement unit 630 records the calculated spiral velocity SVE(s+1) in the area of the spiral velocity corresponding to the target position TP(s+1) of the target position/spiral velocity table TB2.

FIG. 9 shows an example of a target position/target spiral timing table TB3 according to the present embodiment. FIG. 9 corresponds to, for example, FIGS. 7 and 8. The target position/target spiral timing table TB3 of FIG. 9 includes target positions . . . , TP(s−1), TP(s), TP(s+1), . . . , target track numbers . . . , TN(s−1), TN(s), TN(s+1), . . . which correspond to the target positions, and target spiral timing . . . , dTts(s−1), dTts(s), dTts(s+1), . . . which correspond to the target positions. In FIG. 9, the target spiral timing dTts(s−1) corresponds to the target position TP(s−1), the target spiral timing dTts(s) corresponds to the target position TP(s), and the target spiral timing dTts(s+1) corresponds to the target position TP(s+1).

In the example shown in FIG. 9, the measurement unit 630 calculates target spiral timing dTts(s−1) based on the equation (3) and the spiral velocity SVE(s−1) corresponding to the target position TP(s−1) of the target position/spiral velocity table TB2 shown in FIG. 8. The measurement unit 630 records the calculated target spiral timing dTts(s−1) in the area of the target spiral timing corresponding to the target position TP(s−1) of the target spiral timing table TB3.

In the example shown in FIG. 9, the measurement unit 630 calculates target spiral timing dTts(s) based on the equation (3) and the spiral velocity SVE(s) corresponding to the target position TP(s) of the target position/spiral velocity table TB2 shown in FIG. 8. The measurement unit 630 records the calculated target spiral timing dTts(s) in the area of the target spiral timing corresponding to the target position TP(s) of the target position/target spiral timing table TB3.

In the example shown in FIG. 9, the measurement unit 630 calculates target spiral timing dTts(s+1) based on the equation (3) and the spiral velocity SVE(s+1) corresponding to the target position TP(s+1) of the target position/spiral velocity table TB2 shown in FIG. 8. The measurement unit 630 records the calculated target spiral timing dTts(s+1) in the area of the target spiral timing corresponding to the target position TP(s+1) of the target position/target spiral timing table TB3.

FIG. 10 shows an example of a target position/position conversion factor table TB4 according to the present embodiment. FIG. 10 corresponds to, for example, FIGS. 7 and 8. The target position/position conversion factor table TB4 of FIG. 10 includes target positions . . . , TP(s−1), TP(s), TP(s+1), . . . , target track numbers . . . , TN(s−1), TN(s), TN(s+1), . . . which correspond to the target positions, and position conversion factors . . . , SG(s−1), SG(s), SG(s+1), . . . which correspond to the target positions. In FIG. 10, the position conversion factor SG(s−1) corresponds to the target position TP(s−1), the position conversion factor SG(s) corresponds to the target position TP(s), and the position conversion factor SG(s+1) corresponds to the target position TP(s+1).

In the example shown in FIG. 10, the measurement unit 630 calculates a position conversion factor SG(s−1) based on the equation (4) and the spiral velocity SVE(s−1) corresponding to the target position TP(s−1) of the target position/spiral velocity table TB2 shown in FIG. 8. The measurement unit 630 records the calculated position conversion factor SG(s−1) in the area of the position conversion factor corresponding to the target position TP(s−1) of the target position/position conversion factor table TB4.

In the example shown in FIG. 10, the measurement unit 630 calculates a position conversion factor SG(s) based on the equation (4) and the spiral velocity SVE(s) corresponding to the target position TP(s) of the target position/spiral velocity table TB2 shown in FIG. 8. The measurement unit 630 records the calculated position conversion factor SG(s) in the area of the position conversion factor corresponding to the target position TP(s) of the target position/position conversion factor table TB4.

In the example shown in FIG. 10, the measurement unit 630 calculates a position conversion factor SG(s) based on the equation (4) and the spiral velocity SVE(s) corresponding to the target position TP(s) of the target position/spiral velocity table TB2 shown in FIG. 8. The measurement unit 630 records the calculated position conversion factor SG(s) in the area of the position conversion factor corresponding to the target position TP(s) of the target position/position conversion factor table TB4.

FIG. 11 is a diagram showing an example of variations of target spiral timing with a track number. In FIG. 11, the vertical axis indicates a track number (or a radial position), and the horizontal axis indicates target spiral timing. In the vertical axis of FIG. 11, the track number increases toward the "positive" direction of the double-headed arrow and decreases toward the "negative" direction thereof. In the vertical axis of FIG. 11, an area in the "negative" direction from 0 corresponds to the acceleration area AA, and an area in the "positive" direction from 0 corresponds to the constant velocity area CVA. In addition, in the vertical axis of FIG. 11, the "positive" direction of the track number corresponds to the outward direction, and the "negative" direction thereof corresponds to the inward direction. In the horizontal axis of FIG. 11, the target spiral timing increases toward the direction of the arrow. The variations of target spiral timing with a track number in FIG. 11 may be referred to simply as variations of target spiral timing TSC(a−1), TSC(a) and TSC(a+1) hereinafter.

For example, variations TSC(a−1), TSC(a) and TSC(a+1) of the target spiral timing are calculated based on the target position/target spiral timing table TB3. In the example shown in FIG. 11, in the constant velocity area CVA, the variations are made in proportion to a track number. In the constant velocity area CVA, furthermore, the variations increase toward the positive direction (outward direction) of the track number and decrease toward the negative direction (inward direction) of the track number. In the acceleration area AA, the variations are made non-linearly with respect to the track number. In the acceleration area AA, furthermore, the variations increase exponentially toward the positive direction (outward direction) of the track number, and decrease exponentially toward the negative direction (inward direction) of the track number.

FIG. 12 is a diagram showing an example of variations PCC of a position conversion factor with a track number. In FIG. 12, the vertical axis indicates a track number (or a radial position) and the horizontal axis indicates a position conversion factor. In the vertical axis of FIG. 12, the track number increases toward the "positive" direction of double-headed arrow and decreases toward the "negative" direction thereof. In the vertical axis of FIG. 12, an area in the negative direction from 0 corresponds to the acceleration area AA, and an area in the positive direction from 0 corresponds to the constant velocity area CVA. Furthermore, in the vertical axis of FIG. 12, the positive direction of the track number corresponds to the outward direction, and the negative direction thereof corresponds to the inward direction. In the horizontal axis of FIG. 12, the position conversion factor increases toward the direction of the arrow. The variations PCC of a position conversion factor with a track number in FIG. 12 may be referred to simply as variations PCC of a position conversion factor hereinafter.

For example, variations PCC of a position conversion factor is calculated based on the target position/position conversion factor table TB4. In the example shown in FIG. 12, the variations PCC are constant in the constant velocity area CVA. The variations PCC decrease with decrease in the track number in the acceleration area AA. In other words, the variations PCC increase with increase in the track number in the acceleration area AA. In the example shown in FIG. 12, the variations PCC are made linearly, but may be made non-linearly in the acceleration area AA.

The servo write controller 640 writes a product servo pattern (or a final servo pattern) SV to the disk 10 based on the spiral servo pattern SSV. The servo write controller 640 calculates a positional error of each position of the head 15 with respect to a plurality of spiral servo patterns SSV in each radial position of the disk 10 (which may be referred to simply as a positional error hereinafter) on the basis of each timing (which may be referred to as detection spiral timing hereinafter) with which the spiral servo patterns SSV are detected with the head 15 placed at the radial position of the disk 10 and each target spiral timing in the radial position of the disk 10. Then, the servo write controller 640 writes a plurality of product servo patterns SV radially to the disk 10 under feedback control on the basis of the calculated positional error.

For example, when the servo write controller 640 writes a plurality of product servo patterns SV into the acceleration area AA, it calculates each positional error by integrating each position conversion factor into a difference value between detection spiral timing at each radial position of the disk 10 and target spiral timing at each radial position of the disk 10 on the basis of the target position/target spiral timing table TB3 and the target position/position conversion factor table TB4. Then, the servo write controller 640 writes a plurality of product servo patterns SV radially to the disk 10 under feedback control on the basis of the calculated positional error.

For example, when the servo write controller 640 writes a plurality of product servo patterns SV into the acceleration area AA, it calculates a positional error, which corresponds to each radial position of the acceleration area AA, by integrating each position conversion factor into a difference value between detection spiral timing at each radial position of the acceleration area AA and target spiral timing at each radial position of the acceleration area AA on the basis of the target position/target spiral timing table TB3 and the target position/position conversion factor table TB4. Then, the servo write controller 640 writes a plurality of product servo patterns SV radially to the disk 10 under feedback control on the basis of the calculated positional error.

Figure 13:
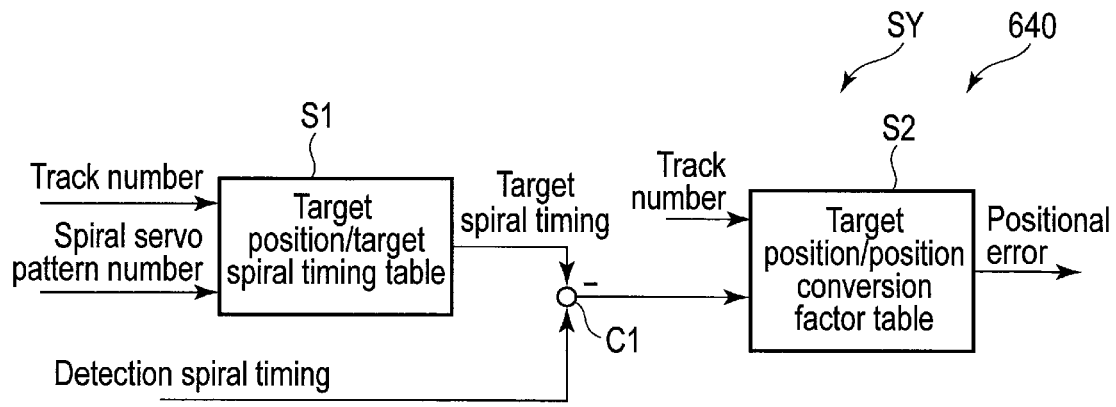
FIG. 13 is a block diagram showing an example of a position control system of the head during a servo write process according to the embodiment.

FIG. 13 is a block diagram showing an example of a position control system SY of the head 15 during the servo write process according to the present embodiment.

The servo write controller 640 includes a position control system (which may be referred to as a servo write control system hereinafter) SY of the head 15 during the servo write process. The servo write controller 640 includes a processing system S1, a processing system S2 and a computing unit C1. The processing system S1 includes the target position/target spiral timing table TB3. The processing system S2 includes the target position/position conversion factor table TB4.

The processing system S1 is supplied with a target track number and a spiral servo pattern number (target spiral servo pattern number). The processing system S1 calculates target spiral timing based on the target track number, the target spiral servo pattern number, and the target position/target spiral timing table TB3. The processing system S1 outputs the calculated target spiral timing to the computing unit C1.

The computing unit C1 is supplied with target spiral timing and detection spiral timing with which a plurality of spiral servo patterns SSV are detected with the head 15 placed on a target track. The computing unit C1 outputs a difference value between the detection spiral timing and the target spiral timing to the processing system S2.

The processing system S2 receives the target track number and the difference value. The processing system S2 calculates a positional error based on the target track number, the difference value, and the target position/position conversion factor table TB4. For example, the processing system S2 acquires a position conversion factor from the target track number and the target position/position conversion factor table TB4, and integrates the position conversion factor into the difference value to calculates a positional error.

The servo write control system SY controls the head 15 based on a plurality of positional errors with respect to a plurality of spiral servo patterns SSV at each radial position of the disk 10 to write a plurality of product servo patterns which extend radially in the radial direction. For example, the servo control system SY controls the head 15 based on a plurality of positional errors with respect to a plurality of spiral servo patterns SSV at each radial position of the disk

10 to write a plurality of product servo patterns, which extend radially in the radial direction, to the acceleration area AA.

Figure 14:
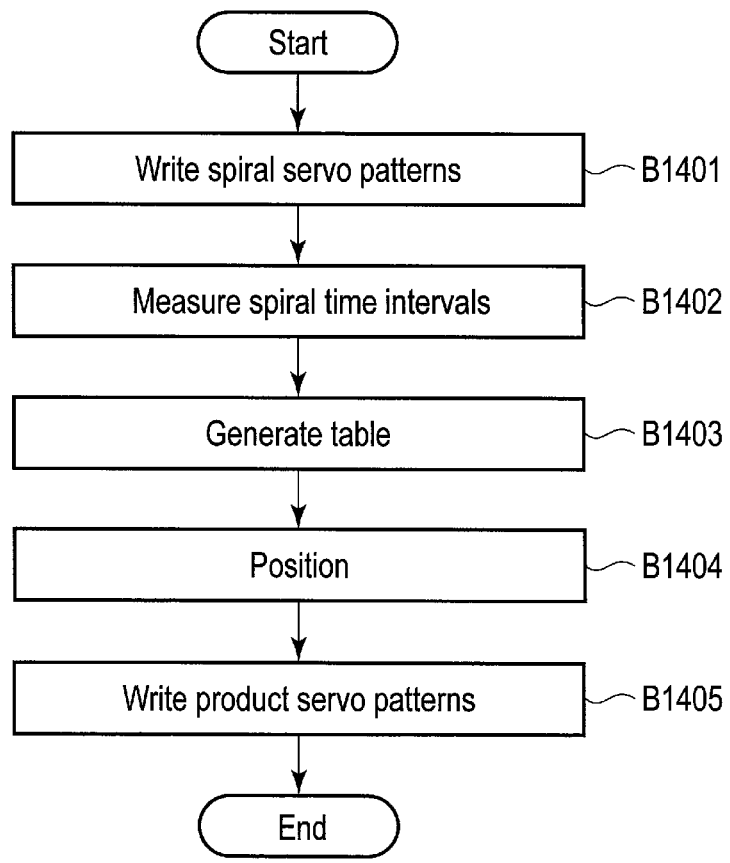
FIG. 14 is a flowchart showing an example of a servo write method according to the embodiment.

FIG. 14 is a flowchart showing an example of a servo write method of the present embodiment.

The MPU 60 writes a plurality of spiral servo patterns SSV spirally in the unload direction from a plurality of circumferential positions arranged at intervals in the circumferential direction at the innermost circumferential position MIP (B1401). For example, the spiral servo patterns SSV have a sync pattern that varies between the acceleration area AA and the constant velocity area CVA. The MPU 60 scans the spiral servo patterns SSV while moving the head 15 at a constant speed in the load direction to measure a plurality of spiral time intervals in the spiral servo patterns SSV (B1402). For example, in the acceleration area AA, the MPU 60 scans the spiral servo patterns SSV while moving the head 15 at a constant speed in the load direction to measure the spiral time intervals in the spiral servo patterns SSV. The MPU 60 generates a table for writing a product servo pattern based on the spiral time intervals (B1403). For example, the MPU 60 generates a table for writing a product servo pattern to the acceleration area AA based on the spiral time intervals. The MPU 60 calculates a positional error corresponding to each radial position of the disk 10 based on the table to position the head 15 in a spiral servo pattern SSV corresponding to the radial position based on the positional error (B1404), to write a plurality of product servo patterns SV that extend radially in the radial direction of the disk 10 (B1405), and to end the process. For example, the MPU 60 calculates a positional error corresponding to each radial position of the acceleration area AA based on the table to position the head 15 in a spiral servo pattern SSV corresponding to each radial position of the acceleration area AA, based on a positional error corresponding to the radial position, to write a plurality of product servo patterns SV that extend radially in the radial direction of the acceleration area AA (B1405), and to end the process.

FIG. 15 is a flowchart showing an example of a table generation method according to the present embodiment. For example, FIG. 15 shows the process of step B1403 in FIG. 14.

The MPU 60 calculates a spiral speed based on the equation (1) and each spiral time interval measured by scanning a plurality of spiral servo patterns SSV while moving the head 15 in the load direction at a constant scanning velocity (B1501). The MPU 60 calculates a detection position based on the equation (2) and each spiral time interval measured by scanning a plurality of spiral servo patterns SSV while moving the head 15 in the load direction at a constant scanning velocity (B1502).

The MPU 60 generates a detection position/spiral velocity table (B1503). Based on the detection position/spiral velocity table, the MPU 60 generates a target position/spiral velocity table by interpolation such as linear interpolation (B1504). The MPU 60 generates a target spiral timing table based on the target position/spiral velocity table and the equation (3) (B1505). The MPU 60 generates a target position/position conversion factor table based on the target position/spiral velocity table and the equation (4) (B1506), and proceeds to step B1403.

According to the embodiment, the magnetic disk device 1 writes a plurality of spiral servo patterns SSV toward the unload direction from a plurality of circumferential positions located at particular intervals in the circumferential direction in the innermost circumferential position MIP. The magnetic disk device 1 scans the spiral servo patterns SSV while moving the head 15 in the load direction at a constant velocity to measure a plurality of spiral time intervals in the spiral servo patterns SSV. The magnetic disk device 1 calculates spiral velocity based on the spiral time intervals and calculates a detection position based on the spiral time intervals. The magnetic disk device 1 generates a detection position/spiral velocity table. The magnetic disk device 1 generates a target position/spiral velocity table based on the detection position/spiral velocity table. The magnetic disk device 1 generates a target position/target spiral timing table based on the target position/spiral velocity table. The magnetic disk device 1 generates a target position/position conversion factor table based on the target position/spiral velocity table. Based on the target position/target spiral timing table and the target position/position conversion factor table, the magnetic disk device 1 calculates a positional error when the head 15 is positioned at each radial position of the disk 10, for example, the acceleration area AA. Based on the positional error corresponding to each radial position of the disk 10, for example, the acceleration area AA, the magnetic disk device 1 positions the head 15 in the spiral servo pattern SSV at each radial position, and writes a plurality of product servo patterns SV, which extend radially in the radial direction of the disk 10, for example, the acceleration area AA, to the acceleration area AA. Therefore, the magnetic disk device 1 can be improved in its format efficiency. Accordingly, the magnetic disk device 1 can improve the recording capacity of the disk 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A servo write method applied to a magnetic disk device including a head to write and read data and a disk having a plurality of spiral servo patterns which are written spirally in a first direction from a first area of the disk on an innermost circumference thereof to a second area of the disk outside the first area, the method comprising:
    moving the head in a second direction opposite to the first direction to read each of the spiral servo patterns, wherein the spiral servo patterns are written by the head at an accelerated velocity in the first area and at a constant velocity in the second area;
    measuring a plurality of time intervals at which each of the spiral servo patterns is read in the first area; and
    writing a plurality of servo patterns to the first area based on the time intervals.

2. The method of claim 1, further comprising:
    calculating a positional error of the head with respect to the spiral servo patterns in each position of the first area in a radial direction of the disk based on the time intervals; and
    writing the servo patterns to the first area based on the positional error.

3. The method of claim 2, further comprising:
    generating a first table indicating timing with which the head reads the spiral servo patterns in each position of the first area based on the time intervals;

generating a second table indicating a factor to convert timing with which the spiral servo patterns are detected in each position of the first area based on the time intervals; and calculating the positional error based on the first table and the second table.

4. The method of claim 1, wherein a first sync pattern of the first area of the spiral servo patterns and a second sync pattern of the second area of the spiral servo patterns are different in polarity.

5. The method of claim 4, wherein the first sync pattern and the second sync pattern are opposite to each other.

6. The method of claim 1, wherein the servo patterns are written radially to the disk.

7. The method of claim 1, wherein the head is moved in the second direction at a constant velocity in the first and second areas.

8. A magnetic disk device comprising:

a head to write and read data;

a disk having a plurality of spiral servo patterns which are written spirally in a first direction from a first area of the disk on an innermost circumference thereof to a second area of the disk outside the first area, the spiral servo patterns being written by the head at an accelerated velocity in the first area and at a constant velocity in the second area; and a controller which moves the head in a second direction opposite to the first direction at a constant velocity to read each of the spiral servo patterns, measures a plurality of time intervals at which each of the spiral servo patterns is read in the first area, and writes a plurality of servo patterns to the first area based on the time intervals.

9. The device of claim 8, wherein the controller calculates a positional error of the head with respect to the spiral servo patterns in each position of the first area in a radial direction of the disk based on the time intervals and writes the servo patterns to the first area based on the positional error.

10. The device of claim 9, wherein the controller generates a first table indicating timing with which the head reads the spiral servo patterns in each position of the first area based on the time intervals, generates a second table indicating a factor to convert timing with which the spiral servo patterns are detected in each position of the first area based on the time intervals, and calculates the positional error based on the first table and the second table.

11. The device of claim 8, wherein a first sync pattern of the first area of the spiral servo patterns and a second sync pattern of the second area of the spiral servo patterns are different in polarity.

12. The device of claim 11, wherein the first sync pattern and the second sync pattern are opposite to each other.

13. The device of claim 8, wherein the controller writes the servo patterns radially to the disk.

14. The device of claim 8, wherein the controller moves the head in the second direction at a constant velocity in the first and second areas.

15. A magnetic disk device comprising:

a disk including a plurality of spiral servo patterns which are written in a first sync pattern written at an accelerated velocity in a first area of the disk on an innermost circumference thereof and which are written in a second sync pattern written at a constant velocity in a second area of the disk outside the first area;

a head which writes data to the disk and reads data from the disk; and a controller which writes a plurality of servo patterns extending in a radial direction of the disk, based on the spiral servo patterns.

16. The device of claim 15, wherein the first sync pattern and the second sync pattern are opposite to each other.

17. The device of claim 15, wherein the controller moves the head in a first direction from the second area to the first area at a constant velocity to scan each of the spiral servo patterns, measures a plurality of time intervals at which each of the spiral servo patterns is read in the first area, and writes a plurality of servo patterns, which extend in the radial direction, to the first area based on the time intervals.

18. The device of claim 15, wherein the second area is adjacent to the first area in an outward direction thereof.

19. The device of claim 15, wherein the first sync pattern of the first area of the spiral servo patterns and the second sync pattern of the second area of the spiral servo patterns are different in polarity.

* * * * *